(12) United States Patent
Chisnall

(10) Patent No.: US 9,759,606 B2
(45) Date of Patent: Sep. 12, 2017

(54) COLOR AND EFFECTS IN PLASTIC MATERIALS

(71) Applicant: COLORMATRIX HOLDINGS, INC., Wilmington, DE (US)

(72) Inventor: David Andrew Chisnall, Merseyside (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 125 days.

(21) Appl. No.: 14/442,574

(22) PCT Filed: Nov. 8, 2013

(86) PCT No.: PCT/IB2013/060007
§ 371 (c)(1),
(2) Date: May 13, 2015

(87) PCT Pub. No.: WO2014/076619
PCT Pub. Date: May 22, 2014

(65) Prior Publication Data
US 2016/0282185 A1    Sep. 29, 2016

Related U.S. Application Data

(60) Provisional application No. 61/725,637, filed on Nov. 13, 2012.

(51) Int. Cl.
*G01J 3/46* (2006.01)
*C09D 5/36* (2006.01)
*B29B 7/08* (2006.01)
*B29B 7/00* (2006.01)
*B29K 105/00* (2006.01)

(52) U.S. Cl.
CPC .............. *G01J 3/463* (2013.01); *B29B 7/002* (2013.01); *B29B 7/08* (2013.01); *C09D 5/36* (2013.01); *B29K 2105/0032* (2013.01)

(58) Field of Classification Search
CPC ................. C09D 5/36; G01J 3/46; B29B 7/08
See application file for complete search history.

(56) References Cited

U.S. PATENT DOCUMENTS

| | | | |
|---|---|---|---|
| 6,362,885 B1 | 3/2002 | Osumi et al. | |
| 6,539,325 B1 * | 3/2003 | Numata ................... | G01J 3/46 356/402 |
| 6,772,151 B1 | 8/2004 | Johnston et al. | |
| 8,372,321 B2 | 2/2013 | Chisnall et al. | |
| 2001/0041966 A1 | 11/2001 | Corrigan et al. | |
| 2005/0044111 A1 | 2/2005 | Masuda et al. | |

FOREIGN PATENT DOCUMENTS

| | | |
|---|---|---|
| EP | 0375317 B1 | 6/1990 |
| EP | 0767362 B1 | 4/1997 |
| JP | 2001-127030 A | 5/1989 |
| JP | 2010-310727 A | 11/1998 |
| JP | 2003-531040 A | 10/2003 |
| JP | 2004-521314 A | 7/2004 |
| JP | 2010-514849 A | 7/2004 |
| JP | 2011-005925 A | 1/2011 |
| JP | 2011-522073 A | 7/2011 |
| WO | 2008078079 A2 | 7/2008 |

* cited by examiner

*Primary Examiner* — Robert Harlan
(74) *Attorney, Agent, or Firm* — Fay Sharpe LLP

(57) ABSTRACT

A method of determining a recipe for providing a desired color and a desired effect, for example, a pearlescent effect, comprises: i. Providing a group of different effect materials, which suitably includes no more than 20 members, for inclusion in the recipe; ii. Selecting an effect from said group which is closest to the desired effect; iii. Directing a match prediction system to use the selected effect material to determine a recipe, wherein the match prediction system determines a recipe based on the selected effect material and color information relating to the color to be matched. A method of preparing a liquid color/effect formulation for addition to plastics is also described.

20 Claims, 1 Drawing Sheet

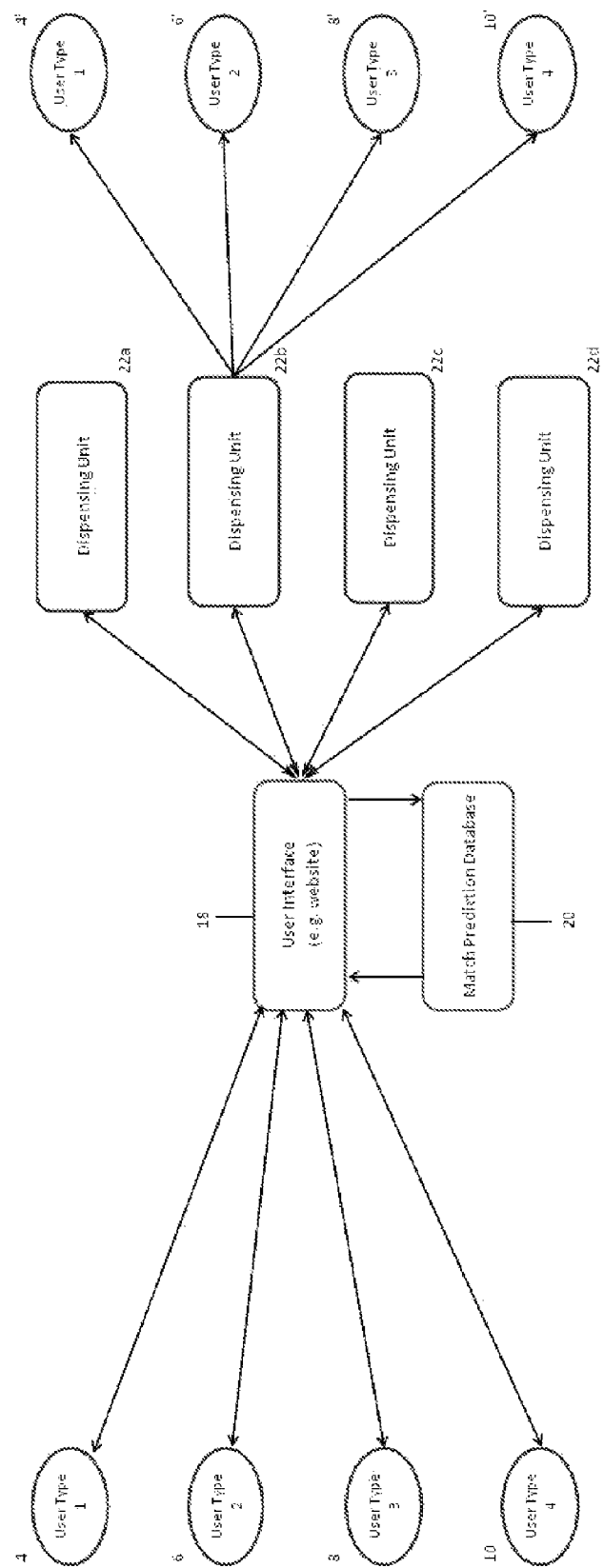

COLOR AND EFFECTS IN PLASTIC MATERIALS

The invention relates to the provision of desired colour and effects in plastics materials. Preferred embodiments relate to the matching of both colour and effects in plastics materials.

WO2008/078079 (ColorMatrix) describes a method and system for selecting and delivering colour formulations for use in colouring thermoplastic polymeric materials. The colour formulations are made by combining single colourant dispersions in predetermined quantities. The disclosure does not describe preparation of formulations which include effect pigments.

Effect pigments include laminar or plate-like pigments which impart an effect (e.g. a pearly or nacreous lustre, or a granite, marble, holography or glitter-like effect) into plastics or other materials. Such effect pigments can be used to introduce a desirable effect to plastics components which is generally more attractive compared to components simply made using colourants as in WO2008/078079 which do not include effect pigments.

U.S. Pat. No. 6,772,151 (Polyone) describes a colour matching system and method. Although it references the use of visual effects comprising holographic flake, granite, marble or pearlescence, it does not, inter alia, disclose how colour and effects are matched or formulations comprising colour and effects are prepared.

Matching effects, for example pearlescent effects, is not trivial. There are many hundreds of pearlescent pigments that may be used and providing an inventory which includes a substantial number is expensive and complicates the process by which such pigments may be selected to match a particular effect. Furthermore, if pearlescent pigments are provided in respective liquid formulations for selection and addition into plastics materials, it is necessary to prepare and store as many pearlescent formulations as may be required in the matching process (numerous such formulations will be required) which is a significant undertaking; and will produce a substantial and costly inventory. Furthermore, once incorporated into liquid formulations, the pigments could not be used in other applications or returned to a manufacturer if surplus to requirements. It is an object of the present invention to address the aforementioned problems.

An alternative means of incorporating effect pigments into thermoplastics materials involves compounding a masterbatch which contains an effect pigment with thermoplastic material. However, in general, effect pigments are susceptible to damage during the mechanical processes (e.g. applied shear/mixing and extrusion) used to incorporate them into masterbatches. Such damage may reduce the effect and/or necessitate increasing amounts of the pigments being needed to produce a desired effect. It is an object of the present invention to address this problem. For example, it is an object to reduce stress on effect pigments and produce a coloured thermoplastic with improved brightness and/or effect lustre compared to when masterbatches (or liquid concentrates) are added to thermoplastics.

It is desirable, as in WO2008/078079, for a match prediction system and formulation dispensing system to be as simple as possible to operate so this can be undertaken by relatively unskilled operatives. Existing means of matching colours and effects tend to require operatives to have a considerable amount of knowledge and experience. For example, firstly, the effect must be identified; this may be done by the naked eye, using a microscope, by trial and error, or a combination of these. Secondly, the colour to be added to the effect is identified, normally by trial and error, and multiple formula revisions are undertaken, until the required colour and effect combination is achieved. Thirdly, knowledge and understanding of end use requirements is needed to ensure the formulation meets all regulatory and processing requirements. Fourthly, a level of knowledge and understanding is required to ensure a liquid formulation prepared is rheologically suitable and has a sufficiently long shelf life to meet end use requirements. It is an object of the present invention to address the aforementioned problems.

It is an object of the present invention to provide a simple to use and versatile system and method of matching colours and effects and produce liquid formulations which are stable and/or pumpable for use in thermoplastics.

According to a first aspect of the invention, there is provided a method of determining a recipe for providing a desired colour and a desired effect in a plastics material, the method comprising:

(i) providing a group of different effect materials which may be selected for inclusion in the recipe;

(ii) selecting an effect material from said group which is closest to the desired effect;

(iii) directing a match prediction system to use the selected effect material to determine a recipe, wherein the match prediction system determines a recipe based on said selected effect material and colour information relating to the colour to be matched.

An effect material may be any material which provides additional colour effects such as angular dependence (e.g. iridescence, colour travel or lustre) or texture when incorporated into the plastics material. The effect material preferably provides a lustrous effect when incorporated.

The effect material preferably comprises a laminar or plate-like material, for example a laminar or plate-like pigment.

Effect materials may be selected to provide a pearly or nacreous lustre or a granite, marble, holography or glitter-like effect. An effect material may be selected from metallic oxide coated mica pigments (e.g. pearlescents), aluminium flake pigments, iron flake, stainless steel flake pigments, gold bronze pigments and zinc pigments. The effect material may comprise a marker pigment.

The group of different effect materials may include no more than twenty, for example fifteen or less or ten or less members. By limiting the number of members various advantages result. For example, the inventory may be minimised and yet, by careful selection of appropriate effect materials, a very wide range of colours and effects can be matched.

Said group of different effect materials preferably includes at least two, preferably at least four laminar or plate-like pigments. Said group may include twenty or less laminar or plate-like pigments. It may include fifteen or less of said pigments.

Said group of different effect materials preferably include at least two, preferably at least four, more preferably at least six, pigments arranged to produce a pearlescent effect when incorporated in the plastics material. Said group may include twenty or less pigments arranged to produce a said pearlescent effect. It may include fifteen or less of said pigments.

Said group of different effect materials preferably includes at least two, preferably at least four, more preferably at least six, metallic oxide coated mica pigments. Said group may include twenty or less metallic oxide coated mica pigments. It may include fifteen or less of said pigments.

Said group of different effect materials may include a first silver effect pigment and a first gold effect pigment. It may also include a first white effect pigment. The aforementioned first silver, gold and white effect pigments may be arranged to produce pearlescent effects and suitably each is a metallic oxide coated mica pigment.

Unless otherwise stated, particle sizes described herein may be assessed by laser diffraction, suitably in accordance with ISO13320.

Said group of different effect materials may include a second silver effect pigment and a second gold effect pigment. It may also include a second white effect pigment. The aforementioned second silver, gold and white effect pigments may be arranged to produce pearlescent effects and suitably each is a metallic oxide coated mica pigment.

Said first silver effect pigment may comprise particles having a first number average particle size and said second silver effect pigment may comprise particles having a second number average particle size, wherein said first and second particle sizes are different. The ratio defined as the number average particle size of said second silver effect pigment divided by the number average particle size of said first silver effect pigment is suitably at least 2, preferably at least 3, more preferably at least 4. Said ratio may be less than 50. Preferably, said group includes a silver effect pigment (which may suitably be said first silver effect pigment) having relatively small number average particle size and a silver effect pigment (which may suitably be said second silver effect pigment) having a relatively large number average particle size.

Said first gold effect pigment may comprise particles having a first number average particle size and said second gold effect pigment may comprise particles having a second number average particle size, wherein said first and second particle sizes are different. The ratio defined as the number average particle size of said second gold effect pigment divided by the number average particle size of said first gold effect pigment is suitably at least 2, preferably at least 3, more preferably at least 4. Said ratio may be less than 50. Preferably, said group includes a gold effect pigment (which may suitably be said first gold effect pigment) having relatively small number average particle size and gold effect pigment (which may suitably be said second gold effect pigment) having relatively large number average particle size.

Said first white effect pigment may comprise particles having a first number average particle size and said second white effect pigment may comprise particles having a second number average particle size, wherein said first and second particle sizes are different. The ratio defined as the number average particle size of said second white effect pigment divided by the number average particle size of said first white effect pigment is suitably at least 2, preferably at least 3, more preferably at least 4. Said ratio may be less than 50. Preferably, said group includes a white effect pigment (which may suitably be said first white effect pigment) having relatively small number average particle size and a white effect pigment (which may suitably be said second white effect pigment) having relatively large number average particle size.

Said group of different effect materials preferably includes at first silver effect pigment having a relatively small number average particle size, a second silver effect pigment having a larger number average particle size, a first gold effect pigment having a relatively small number average particle size, and a second gold effect pigment having a larger number average particle size. Optionally, said group may include a first white effect pigment having a relatively small number average particle size and a second white effect pigment having a larger number average particle size.

Said group of different effect pigments may include a bronze effect pigment which is suitably a pearlescent pigment.

Said group of different effect pigments may include a blue effect pigment which is suitably a pearlescent pigment.

Characteristics of each of said effect materials in said group are preferably included in said match prediction system, for example within software of said system, so that the match prediction system is able to determine recipes for matching colour and effects which incorporate any of the effect materials included in said group.

The method may be for matching the colour and effect of a pre-existing material; or may be for producing a selected desired effect in a plastics material, along with a desired colour which may either be matched to a pre-existing colour (e.g. represented on a swatch, as a paint, in a photograph or the like) or may be created independently.

Step (ii) of the method may involve determination of an effect to be provided and/or reproduced in the plastics material. When the method comprises matching an effect associated with a pre-existing material, the method preferably comprises analysis of the pre-existing material, suitably to determine the effect which needs to be reproduced and to allow selection of an effect material which is closest to the effect which needs to be reproduced, from said group.

Analysis of the pre-existing material may be undertaken by visual assessment by an operator or using an analytical device. When it is undertaken by visual assessment, the operator suitably views the pre-existing material and compares the effect reproduced in the pre-existing material to the effects which can be achieved using the match prediction system and/or using the specific effects available for use in the method. To this end, there is suitably provided a visual representation of each effect achievable by the match prediction system. The visual representation may comprise a palette where each effect is reproduced. The operator suitably compares the effect reproduced in the pre-existing material to the effects in the palette and selects an effect from the palette which is closest to the desired effect. The palette may comprise respective swatches comprising relevant material (e.g. plastics material) incorporating each effect material available for use in the method and/or for which characteristics are included in the match prediction system.

When an analytical device is used, it may be arranged to determine the desired effect and select a suitable effect material from said group. Analysis may involve a spectroscopic or microscopic technique.

When an effect is created independently (i.e. it does not involve matching a pre-existing effect), the method may comprise selection of one of the effect materials from said group. This may involve a customer specifying the type of effect required and/or selection from representations, for example swatches, of the effects achievable using the match prediction system.

The method preferably comprises selecting a desired colour to be provided and inputting information relating to the desired colour into the match prediction system. The desired colour may be defined by a sample provided, for example, by a customer. Such a sample may be in the form of a swatch, a paint, part of a photograph or any sample where a desired colour is represented. The sample may reproduce only the desired colour or may reproduce both the desired colour and effect. The method may comprise the step of determining the colour of the sample. This may involve an analytical device for example a spectrometer or the like.

Alternatively, a desired colour may be selected from a pre-existing colour system (e.g. via a Pantone or other reference) and relevant information input into the match prediction system.

Thus, in one preferred embodiment, a colour and effect of a sample may be analysed and the match prediction system used to match as closely as possible the colour and effect. Preferably, the colour and effect are analysed independently in two separate steps. Alternatively, a desired colour and effect may be reproduced by selection of a suitable colour and effect by other means, without a specific sample being available and/or analysed. Preferably, however, the method involves matching colour and effect of a sample.

In step (iii), the match prediction system is directed as aforesaid. This may involve inputting into the system details on the effect material selected from the group. This may be done manually by an operator, for example where the operator has manually selected a desired effect from a palette. Alternatively, it may be input directly from a device used to determine the effect if such a device is used. Preferably, colour information is input into the match prediction system (suitably in a separate step separate from input of the effect material selected) and this may be done manually or automatically via a device which determines colour.

The match prediction system is suitably programmed so that it must produce a recipe which includes the selected effect material. That is, the selected effect material cannot be omitted. It may, however, vary the amount of the effect material to be included in a recipe and colour components (e.g. pigments and/or dyes to be incorporated into the recipe which are not effect materials). Suitably, the match prediction system produces a recipe which incorporates a single effect material which corresponds to that selected in step (ii).

Said match prediction system preferably comprises a computer which is arranged to receive information on an effect selected in step (ii) and colour information and determine a match or close match of the desired colour and effect. Said computer preferably includes a database which includes information relating to each of the effect materials included in said group. Said computer preferably includes a database which comprises information relating to a multiplicity of base colour formulations included in a colour dispense system which is arranged to be used to dispense the colour formulations as herein described. Said computer preferably includes information relating to each base colour formulation included in said colour dispense system. Said computer preferably includes information relating to the spectra in the visible region of each of said base colour formulations and information relating to each of the effect materials provided in said group of different effect materials. Said computer preferably includes information relating to properties and/or effects of said base colour formulations and effect materials when incorporated into different types of plastics, for example, when incorporated into one or more plastics selected from polyesters, polyolefins, styrenic polymers, polycarbonates and polyamides.

Said computer preferably includes means for determining the effect, for example the colour spectrum, resulting from mixing a plurality or a multiplicity of base colour formulations and/or effect materials. Additionally, said computer may be arranged to determine the effect of adding a mixture of a plurality or multiplicity of base colour formulations and/or effect materials to different types of polymeric materials.

Said computer preferably includes means for determining the effect of adding a mixture of a plurality or multiplicity of base colour formulations and/or effect materials at different concentrations into a polymeric material. The computer may also determine the concentration at which a colour/effect formulation prepared according to the recipe should be added into a plastics material.

Preferably, in the method, the match prediction system determines at least two, preferably at least four different recipes for providing a desired colour and effect.

Said match prediction system, for example said computer which includes a database which includes information relating to each of the effect materials in the group and information relating to each base colour formulation, may be provided in a first location. Information on an effect selected in step (ii) and colour information is preferably input into said computer from a second location which is remote from the first location; for example the first and second locations may be at least 1, 50 or 100 miles apart. In some embodiments, the first and second locations may be thousands of miles apart. Information is suitably communicated from the second location to the first location digitally, for example via a global network, for example a global computer network such as the internet. Suitably, access to the match prediction and/or the computer is via a website. For example, information on an effect selected in step (ii) and/or colour information may be communicated by submission of information to a website. The website may then communicate with said match prediction system and information from the match prediction system, for example, a recipe, may then be returned and/or delivered via said website.

Said second location may be the location of a brand manager, designer and/or customer. Step (ii) of the method as described may be carried out at the second location. For example, at the second location, a person (e.g. customer or sales person) may, in step (ii), select an effect material from said group which is closest to the desired effect. This may be done by comparing the desired effect to representations of effects achievable. A desired colour may also be selected as described. Information relating to effect and colour are then communicated to the first location and step (iii) of the method is undertaken.

In the method, information on colours/effects determined in step (iii) by the match prediction system may be communicated back to the second location. This may include information relating to the differences between the colour obtainable via the match prediction system and the desired colour. Information communicated may include the colour spectrum of the colour obtainable. The method may include visually representing the spectra of the colour obtainable and the desired colour on the same output so the two spectra can be compared. The method may include provision of visualisation means at the second location for allowing the colour and/or effect obtainable to be visualised.

The method of the first aspect may include determining a recipe as described and producing a colour/effect formulation for producing a part comprising a plastics material. The method preferably comprises determining a recipe, producing a colour/effect formulation and producing a part which includes a plastics material having the desired colour and desired effect as determined by said match prediction system.

In the method, a recipe determined in step (iii) may be used to produce a fluid colour/effect formulation for addition to a plastics material to produce a part.

The recipe is suitably communicated (e.g. digitally) to a colour dispense system. It is suitably communicated from said match prediction system, optionally via said website, to the colour dispense system which is suitably a computer controlled dispense system.

The method preferably comprises using said colour dispense system which includes a multiplicity of fluid base colour formulations to dispense predetermined amounts of said base colour formulations, in accordance with the recipe determined, into a receptacle.

The colour dispense system may include more than 10, preferably more than 20, more preferably more than 25 fluidic base colour formulations. Each base colour formulation preferably is compatible with a polymeric material, for example thermoplastic polymeric material. Each colour formulation is preferably stable at a temperature at which a polymeric material (e.g. thermoplastic) which it is to colour is melt processible.

Said base colour formulations are preferably non-volatile fluidic colour formulations. Said base colour formulations preferably comprise a non-volatile liquid carrier and one or more pigments or dyes (which are suitably not effect materials). Said base colour formulations are suitably arranged to be dosed into a plastics material. Said formulations are suitably stable and/or not decomposed at a relevant processing temperature. Said formulations are preferably stable when incorporated in a thermoplastic polymeric material which is melt processed for example in an extrusion or injection moulding apparatus. Said formulations are preferably stable and/or do not decompose at temperature of less than 150° C., preferably of less than 200° C., more preferably of less than 250° C.

Said base colour formulations are preferably for use in manufacturing a coloured part comprising a polymeric material for example thermoplastic in a process which comprises heating, for example melt processing, a mixture of a said colour formulation and polymeric material to allow the mixture to be shaped to define the part. The part may be manufactured by extruding and/or moulding, for example injection moulding or compression moulding a mixture comprising polymeric material and a said liquid colour formulation.

Said colour dispense system is suitably provided in a third location which may be different from said first location and/or said second location. For example, said third location may be at least 1, 5, 10 or 50 miles from said first and/or second locations, preferably from both of said first and second locations.

Associated with the (or each) colour dispense system is suitably a collection comprising quantities of each of the effect materials, characteristics of which are included in the match prediction system and/or which are available for selection in the method. Thus, fluidic colour/effect formulations can be prepared using a colour dispense system and effect materials which are available at the same location.

There may be provided at least two, preferably at least three, more preferably at least four colour dispense systems. One may be provided in a third location as described; another may be provided in a fourth location, wherein said third and fourth locations are at least 50 miles from said second location. Other colour dispense systems may be provided at other locations. A network of colour dispense systems may be provided at different locations around the world. The match prediction system is suitably arranged to communicate with each of said colour dispense systems, optionally via said website, suitably so that the same colour/effect formulation can be dispensed by a multiplicity, for example each, colour dispense system. Each colour dispense system preferably contains the same (i.e. identical) base colour formulations.

Said method preferably comprises contacting a fluid formulation which includes one or more colourants dispensed by said colour dispense system with said effect material selected in step (ii) of the method.

In one embodiment, said effect material may be dispersed in a fluid and then the fluid may be contacted with said fluid formulation which includes one or more colourants. It is preferred however for effect materials in solid form to be selected for contact with said fluid formulation which includes one or more colourants and/or which has been dispensed by said colour dispense system. Preferably, therefore, preparation of said colour/effect formulation comprises selecting an effect material in solid, for example solid particulate, form and contacting said solid effect material with a said fluid formulation which includes one or more colourants or with part of said formulation. Thus, the method may include the step of introducing an effect material in solid particulate form into a receptacle in which it is contacted with a said fluid formulation which includes one or more colourants. The method may include introducing a weighed amount of effect material (the weighed amount suitably being in accordance with the recipe) into the receptacle. Weighing may be undertaken manually. Alternatively, the effect materials may be available in pre-weighed amounts (i.e. which are pre-weighed before determination of a recipe in step (iii)) and the method may comprise preparation of a colour/effect fluid formulation using such a pre-weighed effect material. Thus, in this case, the amount of colour/effect formulation prepared will be adjusted so as to use the pre-weighed (pre-determined) amount of effect material.

Pre-weighed amounts of effect material may be supplied in respective receptacles and the contents (i.e. the effect material) dispensed from the receptacles in preparation of the colour/effect formulation; or alternatively, the effect material in solid form may be enclosed, for example in a capsule or the like. The capsule itself may be used to prepare the colour/effect formulation and, suitably, the material from which the capsule is made dissolves and becomes a part of the colour/effect formulation.

After the effect material and fluid formulation which includes one or more colourants have been contacted in a receptacle, mixing means is suitably used to mix the materials and produce a homogenous, preferably substantially stable, colour/effect formulation. A mixing means which does not substantially damage (e.g. bruise or fragment) the effect pigment is suitably selected. This could involve use of a bladed stirrer, operating at a sufficiently low shear as to minimise damage as aforesaid. Preferably, a non-bladed mixer is used. Preferably, the method comprises mixing said effect material and fluid formulation which includes one or more colourants using a mixing means which does not directly contact the components being mixed. Preferably, said mixing means comprises application of a vibratory force to mix the components. For example, said force may comprise shaking the receptacle which contains the components to effect mixing. This may advantageously minimise damage to the effect materials.

It is generally not possible to produce a colour/effect formulation of a desired colour and effect by simply adding effect material to a colour formulation which is the same as the desired colour. This is because addition of the effect pigment not only produces an effect but also affects the colour; and also addition of effect pigment would increase the viscosity of the colour formulation so that the formulation was unusable, for example because it could not be pumped and/or delivered into a plastics material in a melt processing apparatus.

Said colour/effect formulation suitably comprises liquid and solid components. Preferred liquids are selected from a dispersant, a carrier base and a stabiliser base. Said carrier base is suitably arranged to carry and/or mobile solids in the formulation and said stabiliser base is suitably arranged to increase the viscosity of the formulation and stabilise the solids and/or restrict them from settling. Solids in the formulation are suitably selected from pigments and effect materials. The dispersant suitably facilitates dispersion of the solids within the liquids in the formulation. The carrier base suitably has a viscosity in the range 200-20,000 cP at 20° C., suitably measured using a Brookfield viscometer, spindle 7, 20 rpm. It suitably has a boiling point of greater than 250° C. It preferably has a Gardner colour scale value of less than 15. The stabiliser base may be a solid at 20° C., but is preferably a liquid. The viscosity may be in the range 200-100,000 cP at 20° C. when measured as aforesaid. The boiling point may be greater than 250° C.

The total solids content in said colour/effect formulation is suitably 80 wt % or less, preferably 45 wt % or less, more preferably 40 wt % or less, especially 30 wt % or less. The total solids content may be at least 10 wt %, preferably at least 20 wt %, more preferably at least 30 wt %. The balance of material in said colour/effect formulation may comprise liquids, for example selected from dispersant, carrier base and stabiliser base.

The ratio defined as the weight of solids divided by the weight of liquids in said colour/effect formulation is suitably in the range 0.25 to 0.66, preferably in the range 0.4 to 0.6, more preferably in the range 0.45 to 0.55.

The ratio defined as the weight of effect materials in solid form divided by the total weight of solids in the colour/effect formulation may be at least 0.2, preferably at least 0.3, more preferably at least 0.4. The ratio may be less than 0.9.

Said colour/effect formulation may include:

10-40 wt % solids of which at least 30 wt % of the solids consist of effect material; and 60-90 wt % of liquid which includes a dispersant, a carrier base and a stabiliser base.

Said colour/effect formulation may include:

10-40 wt % solids of which at least 30 wt % of the solids consist of effect material;

0.5 to 5 wt % dispersant(s);

29 to 42.5 wt % of carrier base(s); and 29 to 42.5 wt % of stabiliser base(s).

Said colour/effect formulation may have a viscosity in the range 1000-50,000 cP, suitably in the range 2000-30,000 cP, preferably in the range 2000 to 20,000 cP at 20° C., suitably measured using a Brookfield viscometer, spindle 7, 20 rpm.

As described above, a recipe determined in step (iii) may be used to produce a colour/effect formulation for addition to a plastics material to produce a part. The part may be a sample for evaluation by a person for example a customer or potential customer, for example in the second location as described. In this case only a sample quantity (e.g. 10 to 500 g) of colour/effect formulation may be made. Thus, the method may comprise selection of a recipe determined by said match prediction system and making a sample part using the recipe. The sample part may be delivered to a location, separated (e.g. by a distance of at least 10 miles) from where it is made, for evaluation. The method may then comprise:

(i) If the sample part is acceptable, the ordering of production quantities of the colour/effect formulation, suitably via the website; or (ii) a request for an alternative recipe to be determined or a request for an alternative sample part to be made using a previously determined recipe which may have been previously relayed to the second location as possibly suitably.

The method of the first aspect preferably comprises the manufacture and/or the supply of at least 1 kg, suitably at least 10 kg of colour/effect formulation dispensed by a said colour dispense system and including effect material. The formulation may be used to produce parts.

In one preferred embodiment, there is provided a method of determining a recipe for providing a desired colour and a desired effect in a plastics material and producing a colour/effect formulation for producing a part comprising a plastics material, the method comprising:

(i) providing a group of different effect materials which may be selected for inclusion in the recipe;

(ii) selecting an effect material from said group which is closest to the desired effect;

(iii) directing a match prediction system to use the selected effect material to determine a recipe, wherein the match prediction system determines a recipe based on said selected effect material and colour information relating to the colour to be matched and information relating to each base colour formulation included in a colour dispense system, wherein said match prediction system comprises a computer which includes information relating to each base colour formulation included in said colour dispense system and information relating to each of the effect materials provided in said group of different effect materials;

(iv) communicating said recipe to said colour dispense system in a location which also includes a collection comprising quantities of each of the effect materials, information on which is included in the match prediction system;

(v) producing a colour/effect formulation by dispensing liquids from said colour dispense system and adding effect material.

The method of the preferred embodiment may further include making a sample part (which may comprise 10 to 500 g of colour/effect formulation) or a commercial part (e.g. a part intended to be commercially sold and/or used by a customer) in a method which comprises addition of said colour/effect formulation to a plastics material in a melt-processing apparatus.

According to a second aspect of the invention, there is provided apparatus for use in the determination of a recipe for providing a desired colour and desired effect in a plastics material, the apparatus comprising:

(a) a match prediction system which includes characteristics of each effect material in a group of different effect materials which may be selected for inclusion in a recipe;

(b) means for selecting an effect material selected from said group for inclusion in the recipe.

The match prediction system and effect materials may be as described according to the first aspect. The apparatus may be for the method of the first aspect.

The apparatus may include means for inputting colour information of the desired colour into the match prediction system. Said match prediction system suitably includes characteristics of each base colour formulation which may be selected for inclusion in the recipe.

Said means for selecting said effect material and the means for inputting colour information may comprise digital means and may comprise information being inputted via a website.

Said apparatus may include means for provided a visual representation of each effect achievable by the match prediction system as described in the first aspect. The apparatus may comprise a palette wherein each effect available is reproduced in a physical form. Such a palette may be part of the apparatus.

The apparatus may include a colour dispense system as described according to the first aspect. The colour dispense system preferably communicates with the match prediction system. Preferably, the apparatus includes a collection comprising quantities of each of the effect materials, characteristics of which are included in the match prediction system. Said collection is suitably closely associated with the colour dispense system so colour/effect formulations can be prepared using said colour dispense system and selected effect material.

The apparatus may include only one match prediction system.

The apparatus may include a plurality, preferably at least three, more preferably at least four colour dispense systems, suitably at different locations. Each colour dispense system preferably includes the same base colour formulations. The apparatus preferably includes means for selecting which colour dispense system is to be used to dispense colour and/or the location in which a colour/effect formulation is to be prepared.

According to a third aspect, there is provided a method of preparing a liquid colour/effect formulation for addition to plastics, the method comprising:

(i) contacting effect material and one or more colourants in a receptacle;

(ii) using mixing means to mix the components and produce a homogenous colour/effect formulation;

wherein said mixing means does not directly contact the components being mixed.

The colour/effect formulation, its components and the mixing means may be as described according to said first aspect.

According to a fourth aspect, there is provided a method of preparing a colour/effect formulation for addition to a plastics material, the method comprising selecting an effect material in a solid, for example particulate, form, and contacting said solid effect material with a fluid formulation which includes one or more colourants.

The method of the fourth aspect may be as described in the first aspect.

Any feature of any aspect of any invention or embodiment described herein may be combined with any feature of any aspect of any other invention or embodiment described herein mutatis mutandis.

Specific embodiments of the invention will now be described, by way of example, with reference to FIG. 1, which is a schematic drawing of a system for selecting and delivering colour formulations for use in colouring thermoplastic polymeric materials.

The following materials are referred to hereinafter:

(a) The following effect pigments were used.

| Pigment | Form | Particle Size Range Laser diffraction measurement |
|---|---|---|
| Pigment A- a white pearl | Dry free-flowing powder | 5-25 µm |
| Pigment B- a silver pearl | Dry free-flowing powder | 10-60 µm |
| Pigment C- a gold pearl | Dry free-flowing powder | 5-25 µm |
| Pigment D- a gold pearl | Dry free-flowing powder | 5-100 µm |
| Pigment E- a bronze pearl | Dry free-flowing powder | 10-60 µm |
| Pigment F- a blue interference pearl | Dry free-flowing powder | 10-60 µm |
| Pigment G- a white pearl | Dry free-flowing powder | 20-180 µm |
| Pigment H- a gold pearl | Dry free-flowing powder | 10-1100 µm |

A palette of effect pigments as described above may be selected. These may comprise eight effect pigments as illustrated or may include more or fewer such pigments. Nonetheless, the number within the palette is relatively small and is generally far less than would be available for selection in a normal laboratory situation wherein formulations for matching colour and effects may be prepared. In embodiments of the present invention, the effect pigments are chosen to cover most effect types and colour space using the minimum number of effect pigments. For example, the palette may include small particle effect white, silver and gold pigments; and large particle effect white, silver and gold. These may be combined with a small number of interference effect pigments.

(b) Liquid carrier base—an organic vehicle which is suitably an oil used to dilute formulations and act as a medium to carry particulates.

(c) Liquid stabiliser base—a stabiliser which forms a wax or gel-type product. The material is used to aid stability, extend shelf-life of the formulation and dilute the formulation without affecting its overall stability.

(d) Colourant formulations comprised single pigment colourant or additive dispersions comprising of a single colourant or additive dispersed into a liquid system at an optimised level (e) Dispersant—provided to aid dispersion of particulates within the liquid formulation and facilitate processing with plastics material (f) Liquid colourant base—an organic vehicle which is suitably an oil.

Manufacturing of a part comprising a thermoplastic polymer in a desired colour and with a desired effect may be divided into separate elements—firstly, selection of a colour/effect formulation to be used; secondly, manufacture of the colour/effect formulation selected; thirdly, optional preparation of a plaque comprising a potential colour/effect formulation for evaluation; and, fourthly, manufacture of a part using the selected colour/effect formulation. These elements are described further below.

To enable desired effects to be selected, a palette which comprises separate moulded swatches comprising thermoplastic polymer and each of the effect pigments may be provided. The swatches illustrate the effects available for use in preparing formulations. The effect pigments provided are selected to define the majority of effects which may be required by a customer The effects could be designed to be customer specific and a sub-set of an overall list of possible effects. In any event, the number of different effect pigments is kept to a minimum. It will be appreciated that there are many hundreds of effect pigments available. However, by limiting the number of effect pigments in the palette (in one embodiment to eight effect pigments) a workable system is produced which can reproduce the majority of desired effects/colours.

The selection of the colour/effect formulation may start with analysis of a customer's swatch having the desired colour and desired effect. In one embodiment, the swatch is viewed manually to assess the desired effect; the viewed effect is then manually compared to the eight effects in the palette; and the effect closest to the desired effect is selected from the palette. The selected effect pigment is then used in the construction of the colour/effect formulation.

Although selection of the desired effect from the palette may be undertaken manually as described, even by relatively unskilled operatives, in an alternative embodiment, other methods of identifying the effect to be used may be applied including analytical methods such as Raman or Near Infra-Red spectroscopy, microscopy or other analytical techniques. In such cases, a target effect could be presented to the analytical equipment and either the user decides the closest effect to use or the software will suggest required effects in order of preference from those available to be used, for example those in the palette.

Colour information of the swatch may be collated using a spectrophotometer which is used to scan the swatch and determine all relevant information (e.g. $L^*$, $a^*$, $b^*$, $c^*$ etc).

The selected effect pigment and colour information of the swatch are then input into a centralised match prediction system. The system is directed to use the selected effect pigment (i.e. the system cannot vary or substitute this) to define a recipe for a formulation which reproduces as closely as possible the characteristics of the swatch. The system includes a database and associated software and is able to take the selected pigment and the spectophotometric data and predict how to reproduce the effect/colour of the swatch scanned, using an associated dispense system. The dispense system includes 15-32 base colours which are arranged to be mixed in varying ratios to reproduce substantially the entire colour space/spectrum. Further details on the system 16 and colour dispense system are provided hereinafter.

In a first embodiment, illustrated in FIG. 1, a desired colour/effect for a part may be determined in any of a number of first locations 4, 6, 8, 10. For example, in location 4, which may be the premises of a brand manager or designer, a customer may select a colour/effect in which it is desired to manufacture a particular solid part, for example a shampoo bottle. The colour may be selected from: a library of colours, for example displayed on a system website 18 and fed back to location 4; a colour spectrum scanned from a swatch or other reference source; or from a colour standard (e.g. Pantone reference or the like). The effect may be selected from a palette of moulded swatches as described above, by a description of available effects or from representations of available effects displayed on the system website 18. Selected colour and effect information may then be sent digitally over the internet to the system website 18 which in turn communicates with a centralised match prediction system 20. Other information which may be sent from location 4 may include information on the type of polymeric material to be coloured, customer details (e.g. an identification number etc) end use application of the part, legislatory requirements and physical properties required (this would include fastness properties processing details etc.).

In the first embodiment, information on the closest matches which can be achieved using a dispense system 22 may be communicated back to location 4. At location 4, a list of up to fifty alternative matches may then be indicated visually on a calibrated computer monitor so that the customer can see what colours/effects can be achieved using dispense systems 22 and the extent to which achievable colours differ (if they differ at all) from the desired colour. Also, additional information may be communicated back to location 4. For example, spectra of achievable colours may be communicated so that such spectra may be compared with the spectrum of the desired colour. Information on how achievable colours differ from the desired colour may be communicated (e.g. achievable colour is bluer, redder, lighter, darker etc than the desired colour). Information on the cost and/or performance of formulations of achievable colours may be communicated. For example, the best match may be obtained by mixing more base colours and/or more expensive base colours and may be more expensive compared to a wider tolerance option or a poorer performing formulation which may use cheaper base colours. The customer will be able to make a direct visual comparison between colours achievable and compare the cost of using the achievable colours in order to enable a decision to be taken on which, if any, of the achievable colours should be selected, either for immediate purchase or for further evaluation. Further evaluation may involve preparation of a small plaque comprising a selected colour/effect formulation in a relevant thermoplastic. The plaque itself may then be evaluated by the customer.

The customer may then select an achievable colour and order production quantities of the colour/effect formulation. Alternatively, a different colour/effect formulation may be selected and, optionally, one or more further plaques may be prepared and evaluated.

In location 6, a colourist in a colourlab may communicate with the website 18 generally as described for the interaction with location 4. Location 8 may be owned/controlled by the owners/controllers of website 18 and match prediction system 20. In this case, customers may send swatches or other relevant information to location 8 and a user at location 8 may communicate with website 18 to determine an appropriate match. Location 10 may be a customer's premises which is visited by a sales person who works with the customer, for example using a portable spectrophotometer and effects palette, and communicates with website 18 to produce an acceptable colour/match.

In FIG. 1, selected colour/effect formulations may be manufactured using a dispensing unit 22 and/or a plaque may be moulded using such a formulation and the formulation or plaque may be delivered to users 4', 6', 8' and 10'.

In a second embodiment, a swatch to be matched may be sent by a customer to the premises of the owner/controller of the website 18 and match prediction system 20 and an operator may analyse it for both effect and colour as described above and input relevant information into the match prediction system. The match prediction system will then produce a recipe for a formulation. The operator may then dispense a sample of the formulation and use it to mould a plaque from the formulation which may then be delivered, for example by courier, to the customer who may then decide if the sample (and therefore the formulation) is acceptable. Alternatively, the match prediction system may communicate relevant information to a dispense system 22 more local to the customer and a sample formulation and/or a plaque may be prepared as described.

Whilst colour/effect information may be collated from a sample or swatch as described, the standard to be matched may be in other forms—e.g. a plastic part, Pantone reference, page from a magazine or even a painted wall. Any of these may be used to set the target colour. Alternatively, the target colour may be set electronically using a previously stored standard or inputted Lab values or other spectral data. A colour target could also be designed on-screen using a specific software application, thereby allowing a user to design a colour target and apply this to the match prediction system.

In general terms, the dispense system 22 comprises up to thirty-two separate receptacles each of which contains a respective one of thirty-two base formulations. The base formulations suitably comprise liquid (suitably organic liquid) single colourant or additive dispersions of pigments or dyes or other additives. Base formulations suitably include the liquid carrier base and liquid stabiliser base. The base formulations are selected to be stable rheologically and/or colourmetrically over time (e.g. they do not significantly thicken or change or develop different colours over time) so that when incorporated into a colour/effect formulation for addition to a polymer their colour/effect is entirely predictable and will not be affected by the time or temperature of dispense etc.

Each base formulation is provided in a respective receptacle which includes associated pipework for extracting formulation from the receptacle, circulating it and returning it to the receptacle in order to maintain the formulation in a homogenous state, for example as an homogenous dispersion and to avoid any settling of any particles in the formulation.

Each of the receptacles is connected via respective pipework to a dispense station. The dispense station is computer controlled and arranged to control the accurate dispense of fluid from the receptacles into a product receptacle in order to produce a desired formulation for a customer in accordance with information determined by the centralised match prediction system 20.

The system 20 is arranged to receive information on a desired colour/effect and the polymer type to be coloured and determine the identity and amounts of base formulations to be dispensed by the dispense system taking all factors into consideration (in particular the selected effect pigment to be used) and so that the colour of the polymer into which the colour/effect formulation is mixed at a specific concentration is the same as that desired. The system 20 include a database of information relating to each of the base formulations and the eight effect pigments including information on the visible spectrum and colourmetric data of each, including colour strength, polymer type and application information. The system is able to predict, for example by combining spectral information of each formulation and effect pigments, what the colour/effect will be when base formulations and effect pigments are mixed in specific quantities. Additionally, the system includes feedback on any differences perceived in practice between predicted colour/effects and actual colour/effect when viewed in specific polymeric materials and the feedback is continuously used to optimise the predictive ability of the system 20. The system thus enables achievable colour/effect formulations to be predicted accurately and fed back to customers. Furthermore, since the compositions of the base formulations associated with the dispense system are accurately controlled and maintained, any colour/effect selected on the basis of that predicted by system 20 can effectively and accurately be reproduced when required by the dispense system. Thus, only an achievable colour/effect actually selected by a customer is dispensed by the dispense system as a tangible colour/effect formulation.

The system 20, associated dispense system, the base colour formulations and effect pigments should be capable of providing formulations for polymers which have predictable and reproducible colour/effects provided the quality of the aforementioned can be assured in an appropriate Quality Assurance (QA) system. Advantageously, provided the aforementioned are in accordance with a predetermined QA system, there will be no need to subject formulations produced to Quality Control (QC) testing. This minimises operator contact with the formulations and allows formulations to be dispensed automatically and delivered to customers without any testing of the formulations themselves. This allows the dispense and delivery of formulations to be undertaken by relatively un-skilled operatives provided that associated QA systems have been complied with. This may also allow numerous dispense stations to be easily and cheaply established in a range of locations. In some embodiments, a level of testing of base formulations etc. may be undertaken to meet customer requirements, if necessary.

Examples 1 and 2 below illustrate formulations for yellow and blue pearl effect formulations; and Example C1 and C2 illustrate yellow and blue formulations reproducing similar colours but without any pearl effect.

EXAMPLE 1—YELLOW PEARL FORMULATION

| Ingredient and Description | | Quantity wt % |
|---|---|---|
| Dispersant | Clear Liquid | 3.87 |
| Carrier base | Clear Liquid | 15.23 |
| Stabiliser base | Clear Viscous Liquid | 15.23 |
| Pearlescent powder | Pigment A | 17.16 |
| Single white pigment dispersion A | 77 wt % solids content in liquid carrier base | 0.86 |
| Single yellow pigment | 35 wt % solids content in liquid carrier base | 47.65 |

The addition rate of the formulation into plastics (homopolymer polypropylene) was 2.00 wt %.

EXAMPLE C1—YELLOW NON-PEARL FORMULATION

| Ingredient and Description | | Quantity wt % |
|---|---|---|
| Dispersant | Clear liquid | 2.26 |
| Carrier base | Clear liquid | 5.80 |
| Single white pigment-dispersion A | As above | 35.51 |
| Single yellow pigment dispersion B | 40 wt % solids content in liquid carrier base | 32.22 |
| Single yellow pigment dispersion A | As above | 21.30 |
| Single orange pigment dispersion | 20 wt % solids content in liquid carrier base | 2.91 |

The addition rate of the formulation into plastics was 1.47 wt %.

EXAMPLE 2—BLUE PEARL FORMULATION

| Ingredient and Description | | Quantity wt % |
|---|---|---|
| Dispersant | Clear liquid | 6.70 |
| Carrier base | Clear liquid | 28.39 |
| Stabiliser base | Clear viscous liquid | 28.40 |
| Pearlescent powder | Pigment B | |
| Single green pigment dispersion | 68 wt % solids content in liquid colourant base | 31.74 |
| | | 2.67 |
| Single blue pigment dispersion | 25 wt % solids content in liquid colourant base | 2.10 |

The addition rate of the formulation into plastics was 2 wt %.

EXAMPLE C2—BLUE NON-PEARL FORMULATION

| Ingredient and Description | | Quantity wt % |
|---|---|---|
| Single white pigment-dispersion A | As above | 86.74 |
| Single black pigment dispersion | 15 wt % solids content in liquid colourant base | 0.21 |
| Single red pigment dispersion | 24 wt % solids content in liquid colourant base | 1.10 |
| Single blue pigment dispersion | 25 wt % solids content in liquid colourant base | 7.71 |
| Single yellow pigment-dispersion | 25 wt % solids content in liquid colourant base | 4.24 |

The addition rate of the formulation into plastics was 0.52 wt %.

The formulations of Examples 1 and 2 may be prepared using a dispense system.

If a sample of the Example 1 formulation is to be prepared then 100-200 g of the formulation may be prepared if only a plaque for evaluation is to be prepared; otherwise any quantity required for a production run may be prepared. The dispense system 16 is used to dispense the ingredients described in Example 1 (except for the pearlescent powder) into a suitable receptacle. Then, the pearlescent powder is accurately manually weighed out and contacted with the ingredients in the receptacle.

A lid is placed on the receptacle and a paint shaker is used to shake and, therefore, mix the formulation. The mixing process used is completely non-invasive (does not use a blade to mix the product). The mixer can either be vibrational or gyroscopic; either way the mixing process does not impart high levels of shear onto the product. The method is found not to significantly bruise or damage the effect pigments and is advantageous over methods which may use stirrer blades or the like.

Other types of mixers which do not bruise and/or are not significantly detrimental to the effect pigments may be used, to incorporate the effect pigments.

Advantageously, the methods of incorporating the effect pigments reduces damage to the pigments and serves to optimise their effectiveness in use and/or may minimise the amount of pigment required to produce a desired effect in a thermoplastic material. Furthermore, incorporation of effect pigments into liquid formulations as described and introduction of such formulations into a thermoplastic material may result in significantly less damage to the effect pigments in comparison to when masterbatches comprising effect pigments are used as described in the introduction of this specification. For example, preparation of a masterbatch formulation involves melt processing plastics and effect pigment to produce masterbatch pellets in a first thermal cycle; and subsequently masterbatch pellets are added to further plastics material to produce a product in a second thermal cycle. By using liquid formulations as described, then effect pigments are only subjected to one thermal cycle, when the liquid formulation incorporating the effect pigment is melt processed with plastics material. Thus, use of liquid formulations as described may reduce damage to the effect pigments compared to when the masterbatch method is used. This is exemplified with reference to examples which follow.

The other formulations may be prepared in a similar manner to the above.

As an alternative to manual addition of effect pigments as described, it is also possible for the software of the match prediction system to calculate amounts of components to be added to prepare a colour/effect formulation based on a predetermined weight of the selected effect pigment. The quantity of effect pigment would then be supplied either pre-weighed in a receptacle into which liquid components of the colour/effect formulation may be dispensed; or pre-weighed in a container (or capsule or the like) that may be introduced into a receptacle into which liquid components of the colour/effect formulation may be dispensed, with the container (or capsule) dissolving on contact with the liquid components.

When a plaque comprising the formulation is to be manufactured in accordance with the second embodiment described above, this may be done immediately. In this regard, the selected recipe may be dispensed using the dispense system described and mixed using suitable equipment either at the same location that the colour/effect match was undertaken or, if suitable equipment is not available, at a separate location. For colour/effect evaluation purposes, a small 100-200 g sample of colour/effect formulation is required. This formulation is added to the appropriate thermoplastic polymer at the specified addition rate. This may be done manually using a bag or suitable pot; or the formulation could be dosed directly into the polymer processing machinery being used. If weighed into a small quantity of polymer, the polymer and formulation are mixed thoroughly. The colour/effect formulation prepared is then introduced into an injection moulding machine or other relevant polymer processing machinery, and moulded to produce a plaque. Other shapes may be produced, for example swatches or chips; or the actual part (or a representation of the actual part to be ultimately produced by the customer) may be made. The plaque (or other component produced) is then used to assess the colour/effect of the predicted recipe against the required target colour/effect. If this is done at the same location as the part creation, it is possible to directly and immediately assess the quality of the colour/effect and, if required, adjust the colour/effect formulation. Once a suitable formulation has been developed, a plaque (or other part produced) may be despatched to the customer. If the customer subsequently approves the plaque, commercial quantities (e.g. 1 kg-500 kg) of the relevant formulation may be prepared and supplied to the customer.

The system 18 communicates with dispense systems 22. In FIG. 1, the device 18 is shown communicating with a number of dispense stations. For example, dispense stations 22a, 22b, 22c may be in different countries; station 22d may be at a customer's site. Each dispense station is as described above. It may include all the apparatus needed to dispense the base formulations etc. in accordance with the specified QA system. Suitably, the base formulations may be delivered to each of the dispense stations, the formulations having been manufactured in accordance with a QA system elsewhere. The base formulations may carry a "use by" date to ensure when used they are of a predetermined quality. Thus, identical colour/effect formulations can be prepared in each of the dispense stations under the effective control of the system 18 irrespective of where the formulation is dispensed.

Formulations may be dispensed from locations 22 as applicable and shipped to customers 24', 26', 28', 30'. In some cases, it may be desirable to undertake QA after dispense or QC. QC may involve moulding the colour formulation into a plastic part, comparing it with a standard part and checking viscosity and other physical attributes. QA may involve colour measurement of the colour formulation itself, and possibly a simple viscosity check. In some cases, after moulding of a part using a colour formulation, the moulded part may be assessed and information fed back to systems 18, 20 to facilitate improvements to the database and/or predictability of formulations using the system.

The following examples illustrate the benefits of using liquid formulations of pearlescent pigments. In the examples, two grades of pearlescent colourants were used for the testing—rutile Satin A (particle size range 1-15 µm) and Pearl B (particle size range 20-100 µm). Samples of a solid colour concentrate and two equivalent liquid colour concentrates were made using the two grades of colourants. The formulations were chosen to give identical colourant loadings which ensured the manufacturing method was the main variable in the testing process. The formulations are described in the following examples.

The following general manufacturing methods were used:

EXAMPLE C3—SOLID COLOUR CONCENTRATE

The ingredients were weighed out and high speed mixed using a Henschel high speed mixer until fully dispersed. This mixture was then extruded using a twin screw extruder, at a temperature of 220° C. The extrudate was then pelletised into pieces approximately 2 mm diameter by 3-5 mm long.

EXAMPLE 3—LIQUID COLOUR CONCENTRATE PREPARED USING SPINDLE MIXER

The ingredients of the formulations were weighed into an appropriate vessel. Initially 500 g of each formulation was made. The colourant was firstly wetted out by manually mixing using a spatula. The container was then loaded onto a Hamilton Beach HMD200 spindle mixer and mixed until fully dispersed—approximately 3-5 minutes. The product was then decanted into a storage jar and was ready for use.

EXAMPLE 4—LIQUID COLOUR CONCENTRATE PREPARED USING MINIMIX VIBRATIONAL MIXER

The ingredients of the formulations were weighed into an appropriate vessel with a watertight lid. Initially 500 g of each formulation was made. The lid was placed on the container and then placed into a Merris Minimix auto vibrational mixer. The sample was mixed for 90 seconds. After this time, the lid was removed and the product integrity checked; if more mixing was required the lid was replaced and the sample remixed for a further 90 seconds. Once fully mixed the sample was ready for use, and was left in the mixing vessel until required.

EXAMPLE 5—COLOUR SAMPLE PREPARATION 200 g of a standard natural polypropylene homopolymer was weighed into a polyethylene bag, 1.0 wt % of the colour concentrate added and the combination then mixed by shaking the bag vigorously. This was repeated for each of the samples, and repeated again for all samples at addition rates for the colour concentrate of 1.5 wt % and 2.0 wt %.

The colour samples were then moulded to form a colour plaque, 30 mm$^2$×1 mm thick using a BOY XS injection moulding machine. The moulding machine was fully cleaned out and purged using natural uncoloured polymer between each sample, to ensure the integrity of each moulding. Each sample was moulded using the same method; and each sample was manually extruded until colour was observed in the extrudate. The moulding cycle was then started. After disposing of eight parts, between 30 and 36 plaques were collected and retained for measurement.

The following formulations were prepared:

EXAMPLE C4—SOLID COLOUR CONCENTRATE (PREPARED AS IN EXAMPLE C3)

| INGREDIENT | QUANTITY (wt %) |
|---|---|
| Satin A | 25.00 |
| Polymer | 70.00 |
| Additive 1 | 3.00 |
| Additive 2 | 2.00 |

EXAMPLE C5—SOLID COLOUR CONCENTRATE (PREPARED AS IN EXAMPLE C3)

| INGREDIENT | QUANTITY (wt %) |
|---|---|
| Pearl B | 25.00 |
| Polymer | 70.00 |
| Additive 1 | 3.00 |
| Additive 2 | 2.00 |

EXAMPLE 6—LIQUID COLOUR CONCENTRATE (PREPARED AS IN EXAMPLE 3)

| INGREDIENT | QUANTITY (wt %) |
|---|---|
| Satin A | 25.00 |
| Vehicle A | 38.8 |
| Surfactant B | 12.5 |
| Thickener Base | 23.7 |

EXAMPLE 7—LIQUID COLOUR CONCENTRATE (PREPARED AS IN EXAMPLE 4)

| INGREDIENT | QUANTITY (wt %) |
|---|---|
| Satin A | 25.00 |
| Vehicle A | 38.8 |
| Surfactant B | 12.5 |
| Thickener Base | 23.7 |

EXAMPLE 8—LIQUID COLOUR CONCENTRATE (PREPARED AS IN EXAMPLE 3)

| INGREDIENT | QUANTITY (wt %) |
|---|---|
| Pearl B | 25.00 |
| Vehicle A | 38.8 |
| Surfactant B | 12.5 |
| Thickener Base | 23.7 |

EXAMPLE 9—LIQUID COLOUR CONCENTRATE (PREPARED AS IN EXAMPLE 4)

| INGREDIENT | QUANTITY (wt %) |
|---|---|
| Pearl B | 25.00 |
| Vehicle A | 38.8 |
| Surfactant B | 12.5 |
| Thickener Base | 23.7 |

Testing of Samples:

The colour of the plaques prepared as described in Example 5 was measured using a Minolta 3610A spectrophotometer and results recorded for the values of L*, a*, b* Chroma, hue and reflectance spectral data. Average, maximum and minimum values for Chroma and reflectance data were calculated.

Results are provided in the table below:

| Test ID | SAMPLE ID | C*(D65) | h(D65) |
|---|---|---|---|
| Test 1 (0.25% Satin A in polymer) | Example 6 formulation @1.0% Addition Rate | 3.61 | 97.43 |
| | Example 7 formulation @1.0% Addition Rate | 3.53 | 97.40 |
| | Example C4 formulation @1.0% Addition Rate | 3.06 | 100.58 |
| Test 2 (0.38% Satin A in polymer) | Example 7 formulation @1.5% Addition Rate | 3.17 | 99.94 |
| | Example 6 formulation @1.5% Addition Rate | 2.96 | 100.52 |
| | Example C4 formulation @1.5% Addition Rate | 2.55 | 104.47 |
| Test 3 (0.5% Satin A in polymer) | Example 6 formulation @2.0% Addition Rate | 2.82 | 103.59 |
| | Example 7 formulation @2.0% Addition Rate | 2.72 | 104.83 |
| | Example C4 formulation @2.0% Addition Rate | 2.40 | 108.37 |
| Test 4 (0.25% Pearl B in polymer) | Example 8 formulation @1.0% Addition Rate | 5.38 | 93.85 |
| | Example 9 formulation @1.0% Addition Rate | 5.32 | 94.09 |
| | Example C5 formulation @1.0% Addition Rate | 4.71 | 94.04 |
| Test 5 (0.38% Pearl B in polymer) | Example 8 formulation @1.5% Addition Rate | 5.08 | 93.64 |
| | Example 9 formulation @1.5% Addition Rate | 5.05 | 93.66 |
| | Example C5 formulation @1.5% Addition Rate | 4.22 | 94.41 |
| Test 6 (0.5% Pearl B in polymer) | Example 9 formulation @2.0% Addition Rate | 4.89 | 93.43 |
| | Example 8 formulation @2.0% Addition Rate | 4.66 | 93.68 |
| | Example C5 formulation @2.0% Addition Rate | 3.96 | 95.01 |

Chroma is a measure of colour intensity or saturation; the higher the value the higher the colour intensity. The above table shows, for all sample groups tested, the average chroma value is the lowest for the solid colour concentrates (examples C4 and C5). This indicates a reduction in colour intensity and/or luster for this method of manufacture (twin screw extrusion) compared to liquid colour manufacture. The difference is consistent across all the samples tested.

In addition, the variation in the difference in L, a and b values across the range of data points was assessed and it was found that, for examples C4 and C5 formulations, there was more sample to sample variation observed compared to when the liquid colour formulations of Examples 6 to 9 were used. Additionally, for examples C4 and C5 formulations, the reflectance curves were found to show a wider variation between the maximum and minimum values compared to the reflectance when examples 6 to 9 formulations were used.

Thus, the results show that the use of solid colour concentrate produces inferior brightness of the final part made when compared to similar formulations manufactured from liquid colour concentrates. In addition, moulding consistency was much better using liquid colour concentrates in comparison to a solid equivalent. This is accentuated when moulding small parts and using small injection moulding machines.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of determining a recipe for providing a desired colour and a desired effect in a part made from a thermoplastic polymeric material, the method comprising:
   (i) providing a group of different effect materials which may be selected for inclusion in the recipe, wherein said group of different effect materials includes no more than twenty members;
   (ii) selecting an effect material from said group which is closest to the desired effect;
   (iii) directing a match prediction system to use the selected effect material to determine a recipe, wherein the match prediction system determines a recipe based on said selected effect material and colour information relating to the colour to be matched.

2. A method according to claim 1 wherein said group of different effect materials includes no more than ten members.

3. A method according to claim 1, wherein said group of different effect materials includes at least four laminar or plate-like pigments and includes fifteen or fewer of said pigments.

4. A method according to claim 1, wherein said group of different effect materials includes a first silver effect pigment, a first gold effect pigment and a first white effect pigment; and a second silver effect pigment, a second gold effect pigment and a second white effect pigment.

5. A method according to claim 1, wherein characteristics of each of said effect materials in said group are included in said match prediction system.

6. A method according to claim 1, wherein the method comprises matching an effect associated with a pre-existing material and comprises analysis of the pre-existing material to determine the effect which needs to be reproduced and to allow selection of an effect material which is closest to the effect which needs to be reproduced from said group.

7. A method according to claim 1, wherein there is provided a visual representation of each effect achievable by the match prediction system, and, the method comprises selecting a desired colour to be provided and inputting information relating to the desired colour into the match prediction system.

8. A method according to claim 1, which comprises, in step (iii), inputting into the system details on the effect material selected from the group.

9. A method according to claim 1, wherein said match prediction system is programmed so that it must produce a recipe which includes the selected effect material.

10. A method according to claim 1, wherein said match prediction system comprises a computer which is arranged to receive information on an effect selected in step (ii) and colour information and determine a match or close match of the desired colour and effect, wherein said computer includes a database which includes information relating to each of the effect materials included in said group.

11. A method according to claim 10, wherein said computer includes a database which comprises information relating to a multiplicity of base colour formulations included in a colour dispense system which is arranged to be used to dispense colour formulations.

12. A method according to claim 1, wherein said match prediction system is provided in a first location and information on an effect selected in step (ii) and colour information is input into a or said computer from a second location which is remote from the first location.

13. A method according to claim 1, wherein said recipe is communicated to a colour dispense system, the method comprising using said colour dispense system to dispense predetermined amounts of base colour formulations, in accordance with the recipe determined, into a receptacle, wherein associated with the colour dispense system is a collection comprising quantities of each of the effect materials, characteristics of which are included in the match prediction system and/or which are available for selection in the method, said method comprising contacting a fluid formulation which includes one or more colourants dispensed by said colour dispense system with said effect material selected in step (ii) of the method.

14. A method according to claim 13, wherein after the effect material and fluid formulation which includes one or more colourants have been contacted in a receptacle, mixing means is used to mix the materials and produce a homogenous colour/effect formulation, wherein said mixing means comprises a non-bladed mixer.

15. A method according to claim 1, wherein a or said colour/effect formulation includes:
   10-40 wt % solids of which at least 30 wt % of the solids consist of effect material; and
   60-90 wt % of liquid which includes a dispersant, a carrier base and a stabiliser base, wherein said carrier base is arranged to carry and mobilise solids in the formulation and the stabilizer base is arranged to increase the viscosity of the formulation.

16. A method according to claim 1, wherein the method comprises:
   selection of a recipe determined by said match prediction system and making a sample part using said recipe;
   if a sample part is acceptable, the ordering of production quantities of the colour/effect formulation; or a request for an alternative recipe to be determined or a request for an alternative sample part to be made using a previously determined recipe.

17. A method of determining a recipe for providing a desired colour and a desired effect in a part made from a thermoplastic polymeric material and producing a colour/effect formulation for producing a part comprising a thermoplastic polymeric material, the method comprising:
(i) providing a group of different effect materials which may be selected for inclusion in the recipe;
(ii) selecting an effect material from said group which is closest to the desired effect;
(iii) directing a match prediction system to use the selected effect material to determine a recipe, wherein the match prediction system determines a recipe based on said selected effect material, colour information relating to the colour to be matched and information relating to each base colour formulation included in a colour dispense system;
wherein said match prediction system comprises a computer which includes information relating to each base colour formulation included in said colour dispense system and information relating to each of the effect materials provided in said group of different effect materials;
(iv) communicating said recipe to said colour dispense system in a location which also includes a collection comprising quantities of each of the effect materials, information on which is included in the match prediction system;
(v) producing a colour/effect formulation by dispensing liquids from said colour dispense system and mixing with the selected effect material.

18. A method according to claim 10, wherein said computer includes information relating to properties and/or effects of said base colour formulations when incorporated into one or more different types of thermoplastic polymeric materials selected from polyesters, polyolefins, styrenic polymers, polycarbonates and polyamides.

19. A method according to claim 17, wherein said group of different effect materials includes fifteen or fewer laminar or plate-like pigments; and said group of different effect materials includes a first silver effect pigment, a first gold effect pigment, a first white effect pigment; and a second silver effect pigment, a second gold effect pigment and a second white effect pigment.

20. A method of determining a recipe for providing a desired colour and a desired effect in a part made from a thermoplastic polymeric material, the method comprising:
(i) providing a group of different effect materials which may be selected for inclusion in the recipe, wherein said group of different effect materials includes no more than twenty members;
(ii) selecting an effect material from said group which is closest to the desired effect;
(iii) directing a match prediction system to use the selected effect material to determine a recipe, wherein the match prediction system determines a recipe based on said selected effect material and colour information relating to the colour to be matched;
wherein said group of different effect materials includes at least four laminar or plate-like pigments and include fifteen or fewer of said pigments;
wherein said group of different effect materials includes a first silver effect pigment, a first gold effect pigment, a first white effect pigment; and a second silver effect pigment, a second gold effect pigment and a second white effect pigment.

* * * * *